United States Patent
Wallace et al.

(10) Patent No.: US 9,085,957 B2
(45) Date of Patent: Jul. 21, 2015

(54) DISCRETIZED PHYSICS-BASED MODELS AND SIMULATIONS OF SUBTERRANEAN REGIONS, AND METHODS FOR CREATING AND USING THE SAME

(75) Inventors: Jon M. Wallace, Houston, TX (US); Hao Huang, Houston, TX (US); Jing Wan, Sugar Land, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 421 days.

(21) Appl. No.: 13/388,843

(22) PCT Filed: Aug. 10, 2010

(86) PCT No.: PCT/US2010/045031
§ 371 (c)(1),
(2), (4) Date: Feb. 3, 2012

(87) PCT Pub. No.: WO2011/043862
PCT Pub. Date: Apr. 14, 2011

(65) Prior Publication Data
US 2013/0073272 A1 Mar. 21, 2013

Related U.S. Application Data

(60) Provisional application No. 61/249,451, filed on Oct. 7, 2009.

(51) Int. Cl.
*G06G 7/48* (2006.01)
*E21B 49/00* (2006.01)
(Continued)

(52) U.S. Cl.
CPC ............. *E21B 49/00* (2013.01); *E21B 43/00* (2013.01); *G01V 99/00* (2013.01)

(58) Field of Classification Search
CPC ........................................................ G01V 9/00
USPC .............................................................. 703/10
See application file for complete search history.

(56) References Cited

U.S. PATENT DOCUMENTS

| 4,759,636 A | 7/1988 | Ahern et al. |
| 5,058,012 A | 10/1991 | Hinchman et al. |

(Continued)

OTHER PUBLICATIONS

Nonaka, Higher-Order Upwind Method for Viscoelastic Flow, PhD Thesis; 2007; pp. 1-160.*

(Continued)

*Primary Examiner* — Hugh Jones
(74) *Attorney, Agent, or Firm* — ExxonMobil Upstream Research-Law Department

(57) ABSTRACT

Methods for creating and using discretized physics-based models of subsurface regions, which may contain a hydrocarbon reservoir or other subsurface feature(s). The methods may include selecting a pre-solved model, applying a mesh to the pre-solved model, defining the shape of the subsurface region to be modeled, and transforming the pre-solved model, to which the mesh has been applied, to the shape of the subsurface region. In some methods, the pre-solved model is an idealized model. In some methods, the mesh is applied to a solution of potential field lines associated with the pre-solved model, and in some methods, the solution of potential field lines is a composite solution of a plurality of solutions of potential field lines. In some methods, one or more super-shapes are used to define the shape of the subsurface region. In some methods, a hyperelastic strain deformation calculation is utilized for the transforming.

24 Claims, 11 Drawing Sheets

(51) Int. Cl.
*E21B 43/00* (2006.01)
*G01V 99/00* (2009.01)

(56) References Cited

U.S. PATENT DOCUMENTS

| | | | |
|---|---|---|---|
| 5,416,697 A | 5/1995 | Goodman | |
| 5,844,564 A | 12/1998 | Bennis et al. | |
| 6,023,656 A | 2/2000 | Cacas et al. | |
| 6,106,561 A * | 8/2000 | Farmer | 703/10 |
| 6,196,318 B1 | 3/2001 | Gong et al. | |
| 6,266,619 B1 | 7/2001 | Thomas et al. | |
| 6,460,006 B1 | 10/2002 | Corcoran | |
| 6,640,190 B2 | 10/2003 | Nickel | |
| 6,654,692 B1 | 11/2003 | Neff | |
| 6,668,922 B2 | 12/2003 | Ziauddin et al. | |
| 6,745,159 B1 | 6/2004 | Todd et al. | |
| 6,766,255 B2 | 7/2004 | Stone | |
| 6,785,641 B1 | 8/2004 | Huang | |
| 6,804,609 B1 | 10/2004 | Brumbaugh | |
| 6,810,332 B2 | 10/2004 | Harrison | |
| 6,813,564 B2 | 11/2004 | Eiken et al. | |
| 6,813,565 B1 | 11/2004 | Hu et al. | |
| 6,836,731 B1 | 12/2004 | Whalley et al. | |
| 6,840,317 B2 | 1/2005 | Hirsch et al. | |
| 6,842,700 B2 | 1/2005 | Poe | |
| 6,842,725 B1 | 1/2005 | Sarda | |
| 6,892,812 B2 | 5/2005 | Niedermayr et al. | |
| 6,901,391 B2 | 5/2005 | Storm, Jr. et al. | |
| 6,980,929 B2 | 12/2005 | Aronstam et al. | |
| 6,980,940 B1 | 12/2005 | Gurpinar et al. | |
| 7,043,410 B2 | 5/2006 | Malthe-Sorenssen et al. | |
| 7,043,413 B2 | 5/2006 | Ward et al. | |
| 7,054,752 B2 | 5/2006 | Zabalza-Mezghani et al. | |
| 7,062,420 B2 | 6/2006 | Poe, Jr. | |
| 7,066,019 B1 | 6/2006 | Papanastasiou | |
| 7,089,166 B2 | 8/2006 | Malthe-Sorenssen et al. | |
| 7,089,167 B2 | 8/2006 | Poe | |
| 7,099,811 B2 | 8/2006 | Ding et al. | |
| 7,151,845 B2 | 12/2006 | Hu | |
| 7,177,764 B2 | 2/2007 | Stone | |
| 7,181,380 B2 | 2/2007 | Dusterhoft et al. | |
| 7,188,058 B2 | 3/2007 | Hardy et al. | |
| 7,191,062 B2 | 3/2007 | Chi et al. | |
| 7,200,539 B2 | 4/2007 | Ong et al. | |
| 7,369,979 B1 | 5/2008 | Spivey | |
| 7,561,998 B2 | 7/2009 | Panga et al. | |
| 7,603,261 B2 | 10/2009 | Tardy | |
| 7,617,082 B2 | 11/2009 | Childs et al. | |
| 7,617,083 B2 | 11/2009 | Bennis et al. | |
| 7,657,415 B2 | 2/2010 | Panga et al. | |
| 2002/0049575 A1 | 4/2002 | Jalali et al. | |
| 2002/0055868 A1 | 5/2002 | Dusevic et al. | |
| 2004/0176937 A1 | 9/2004 | Jenny et al. | |
| 2005/0015231 A1 | 1/2005 | Edwards et al. | |
| 2005/0121197 A1 | 6/2005 | Lopez de Cardenas et al. | |
| 2005/0199391 A1 | 9/2005 | Cudmore et al. | |
| 2005/0267719 A1 | 12/2005 | Foucault | |
| 2005/0273302 A1 | 12/2005 | Huang et al. | |
| 2005/0273304 A1 | 12/2005 | Oliver et al. | |
| 2006/0015310 A1 | 1/2006 | Husen et al. | |
| 2006/0020438 A1 | 1/2006 | Huh et al. | |
| 2006/0025976 A1 | 2/2006 | Kennon et al. | |
| 2006/0047489 A1 | 3/2006 | Scheidt et al. | |
| 2006/0085174 A1 | 4/2006 | Hemanthkumar et al. | |
| 2006/0149518 A1 | 7/2006 | Oliver et al. | |
| 2006/0160137 A1 | 7/2006 | Martin et al. | |
| 2006/0184329 A1 * | 8/2006 | Rowan et al. | 702/50 |
| 2007/0005312 A1 | 1/2007 | Bateman | |
| 2007/0073527 A1 | 3/2007 | Flandrin et al. | |
| 2007/0083330 A1 | 4/2007 | Frenkel | |
| 2007/0094187 A1 | 4/2007 | Anderson et al. | |
| 2007/0156377 A1 | 7/2007 | Gurpinar et al. | |
| 2007/0244681 A1 | 10/2007 | Cohen et al. | |
| 2007/0271077 A1 | 11/2007 | Kosmala et al. | |
| 2007/0294034 A1 | 12/2007 | Bratton et al. | |
| 2008/0015831 A1 | 1/2008 | Tardy et al. | |
| 2008/0015832 A1 | 1/2008 | Tardy | |
| 2008/0033656 A1 | 2/2008 | Herwanger | |
| 2008/0091396 A1 | 4/2008 | Kennon et al. | |
| 2008/0319674 A1 | 12/2008 | Dai et al. | |
| 2009/0055098 A1 | 2/2009 | Mese et al. | |
| 2009/0187391 A1 | 7/2009 | Wendt et al. | |
| 2009/0254324 A1 | 10/2009 | Morton et al. | |
| 2009/0294122 A1 | 12/2009 | Hansen et al. | |
| 2009/0306899 A1 | 12/2009 | Harris et al. | |
| 2009/0319243 A1 | 12/2009 | Suarez-Rivera et al. | |
| 2010/0017136 A1 | 1/2010 | Birchwood et al. | |
| 2010/0191511 A1 | 7/2010 | Hsu et al. | |

OTHER PUBLICATIONS

MacLachlan: Improving Robustness in Multiscale Methods; Ph D Thesis; 2004; pp. 1-255.*
Stüben; Solving Reservoir Simulation Equations; 9th International Forum on Reservoir Simulation, Abu Dhabi, United Arab Emirates; 2007; 53 pages.*
Prevost et al.; Unstructured 3D Gridding and Upscaling for Coarse Modeling of Geometrically Complex Reservoirs; 9th European Conference on the Mathematics of Oil Recovery—Cannes, France; 2004; pp. 1-8.*
Arbogast et al.; Numerical Subgrid Upscaling of Two-Phase Flow in Porous Media; Proceedings 1999, LNP 552, pp. 35-49, 2000. Springer-Verlag Berlin Heidelberg 2000.*
Prevost; Accurate Coarse Reservoir Modeling Using Unstructured Grids, Flow-Based Upscaling and Streamline Simulation; PhD Thesis, Stanford University; 2003; 248 pages.*
Mohaghegh et al.; Development of Surrogate Reservoir Models (SRM) for Fast Track Analysis of Complex Reservoirs; SPE 99667; SPE Intelligent Energy Conference, Amsterdam, The Netherlands; 2006; pp. 1-50.*
Castellini: Flow Based Grids for Reservoir Simulation; A Report Submitted to the Department of Petroleum Engineering of Stanford University in Partial Fulfillment of the Requirements for the Degree of Master of Science; 2001; 90 pages.*
Barr, A.H., Superquadrics and Angle Preserving Transformations. IEEE Computer Graphics and Applications, Jan. 1981; pp. 11-23.*

* cited by examiner

DISCRETIZED PHYSICS-BASED MODELS AND SIMULATIONS OF SUBTERRANEAN REGIONS, AND METHODS FOR CREATING AND USING THE SAME

CROSS REFERENCE TO RELATED APPLICATIONS

This application is the National Stage of International Application No. PCT/US10/45031, filed 10 Aug. 2010, which claims the benefit of U.S. Provisional Application No. 61/249,451 filed 7 Oct. 2009, the entirety of both incorporated herein by reference.

FIELD OF THE DISCLOSURE

The present disclosure is directed generally to modeling of subsurface regions, and more particularly to physics-guided, or physics-based, systems and methods for creating and utilizing computational models of subsurface regions.

BACKGROUND OF THE DISCLOSURE

A demand exists in the oil and gas field for accurate models of subterranean, or subsurface, regions, such as of subsurface structures and features, fluids, properties, and/or related parameters thereof. Some of the most precise information and tools are available from full-field models, which also may be referred to as full-physics models. These models are complex, implicit, fine-scale computer simulations of the subterranean region to be modeled, and may be based on the fundamental physics of the parameter(s) to be modeled in the subterranean region. These full-physics models may be used for such illustrative purposes as to simulate and/or predict future values, performance, responses to changes in variables, etc. of the corresponding subsurface region, or portions thereof. Specific illustrative, non-exclusive examples include modeling and/or predicting hydrocarbon flow from producer wells, water flow, injectivity of a formation, well drilling, production from a well, completion of a well, and well operability limits, which may refer to the ability of a well to withstand changes in subsurface geomechanical stresses. Advances in modeling techniques have permitted improved simulation of sub-surface regions, including the physics exhibited in these regions, such as non-Darcy and multiphase flow through complicated well configurations.

Historically, these full-physics models are computationally-intensive, demanding implicit models that take significant amounts of time and resources to prepare, validate, and implement. The time required refers to the number of hours that individuals must spend to prepare, validate, and implement the model, with this time typically being performed by one or more of a relatively limited number of individuals with sufficient training and technical expertise to create these models. For example, these individuals may be highly trained individuals having expert knowledge of reservoir fluid flow mechanics, geomechanics, and mathematical modeling of dynamic bodies. In addition, the computational resources required to prepare, validate, and implement these implicit models typically require specialized software and powerful computers, including computers that can implement and solve complex finite element problems.

Understanding the behavior of subsurface regions often involves the use of numerical methods to simulate and/or analyze activities associated with the subsurface region being modeled, such as hydrocarbon recovery, fluid injection or operability limits. One such numerical method includes finite element analysis, which determines an approximate numerical solution to a complex differential equation relating to one or more parameters within the subsurface region of interest. In finite element analysis for modeling of a subsurface region, the subsurface region under study is defined by a finite number of individual sub-regions, or elements. These elements have a predetermined set of boundary conditions. Creating the elements entails gridding, or "meshing," the subsurface region to be modeled. A mesh is a collection of elements that fills a space, with the elements being representative of a system which resides in that space. The process of dividing a subsurface region under study into elements may be referred to as "discretization" or "mesh generation" of the subsurface region.

Finite element methods also use a system of points called nodes, which may represent at least the intersections between adjacent elements of the discretized subsurface region. The elements are programmed to contain the material properties that define how the corresponding subsurface region being modeled will react to certain loading conditions. Nodes are placed at a variable density throughout the subsurface region under study. For modeling of subsurface regions, such as subsurface regions that include a reservoir, changes to the geological system are predicted as changes in parameters associated with the subsurface region, such as fluid pressures, fluid flow rates, temperatures, stresses, and the like. This means that a value for a parameter may be approximated at a particular location by determining that value within its element.

In conventional numerical studies for simulation and modeling of subsurface regions, it is important to explicitly conform to the geometrical shape of the subsurface region under analysis. This means that the elements honor the geometry of the subsurface region, including any subsurface features present in the subsurface region. In this respect, subsurface regions containing hydrocarbon reservoirs, including reservoirs under production, typically contain various forms of natural or manmade subsurface features. Illustrative, non-exclusive examples of natural subsurface features include faults, natural fractures, fluid traps, and formation stratification. Illustrative, non-exclusive examples of man-made subsurface features include a wellbore, perforations from the wellbore, man-made fractures, and wormholes, such as a result of acid injection activities. Man-made subsurface features may result from such activities as drilling, producing, injection, and completion in or near the subsurface region of interest. These subsurface features may affect reservoir behavior. As an illustrative, non-exclusive example, these subsurface features may cause steep gradients in reservoir pressure, porous flow, temperature, and/or stress.

The use of finite elements in modeling of subsurface regions is challenged by the presence of such subsurface features. Conventional numerical simulators require a grid system that honors the geometry of the subsurface region, including subsurface features therein. However, from a geometric standpoint, finite element methods generally benefit from a structured mesh as opposed to an unstructured mesh. Although meshing with an unstructured mesh may be easier than with a structured mesh, unstructured meshes are generally less accurate and can be much less efficient in how they represent the subsurface domain.

The existence of arbitrarily and/or irregularly shaped subsurface features makes it difficult to build a structured mesh. Constructing a high-quality mesh for each geometrical variation may require significant man-power, considerable expertise, and information about the variable, or physics-based, property gradients associated with such features. Failure to honor transmissible boundaries created by wormholes, fractures, stratification breaks and the like can cause simulations of subsurface regions containing these subsurface features to be inaccurate. Moreover, in simulations, or models, of the corresponding subsurface region, a greater mesh density may be necessary in such regions in order to accurately simulate and/or analyze the region, including fluid flow therein. This increase in mesh density may significantly increase the time required to create the mesh and/or the resulting full-physics model, as well as the size of such models.

Creating an accurate mesh, or discretization, of the subsurface region of interest typically represents a substantial portion of the time required to generate a full-physics model of the subsurface region, with the required creation time often being exacerbated by geometric complexities created by the interior and/or exterior complexities of subsurface features present in the subsurface regions. Moreover, prior efforts to manually generate such accurate meshes often have resulted in oversized models of the subsurface region. The difficulties resulting from which include the dramatic (often exponential) increase in time required to solve the computer model.

SUMMARY OF THE DISCLOSURE

The present disclosure relates generally to the simulation of subsurface physics associated with hydrocarbon recovery from or fluid injection into a subsurface region containing a reservoir or other subsurface feature(s). More specifically the present disclosure includes methods for creating and using discretized physics-based models of subsurface regions, which may contain a hydrocarbon reservoir or other subsurface feature(s). The methods may include selecting a pre-solved model, generating a mesh for the pre-solved model, defining the shape of the subsurface region to be modeled, and transforming the mesh of the pre-solved model to the more complicated shape of the subsurface region. In some methods, the pre-solved model is an idealized model. In some methods, the mesh is applied to a solution of potential field lines associated with the pre-solved model, and in some methods, the solution of potential field lines is an aggregate of a plurality of potential field lines. In some methods, one or more supershapes are used to define the shape of the subsurface region, as well as approximate potential field lines. In some methods, a hyperelastic strain deformation calculation is utilized for the transforming.

DETAILED DESCRIPTION AND BEST MODE OF THE DISCLOSURE

Figure 1:
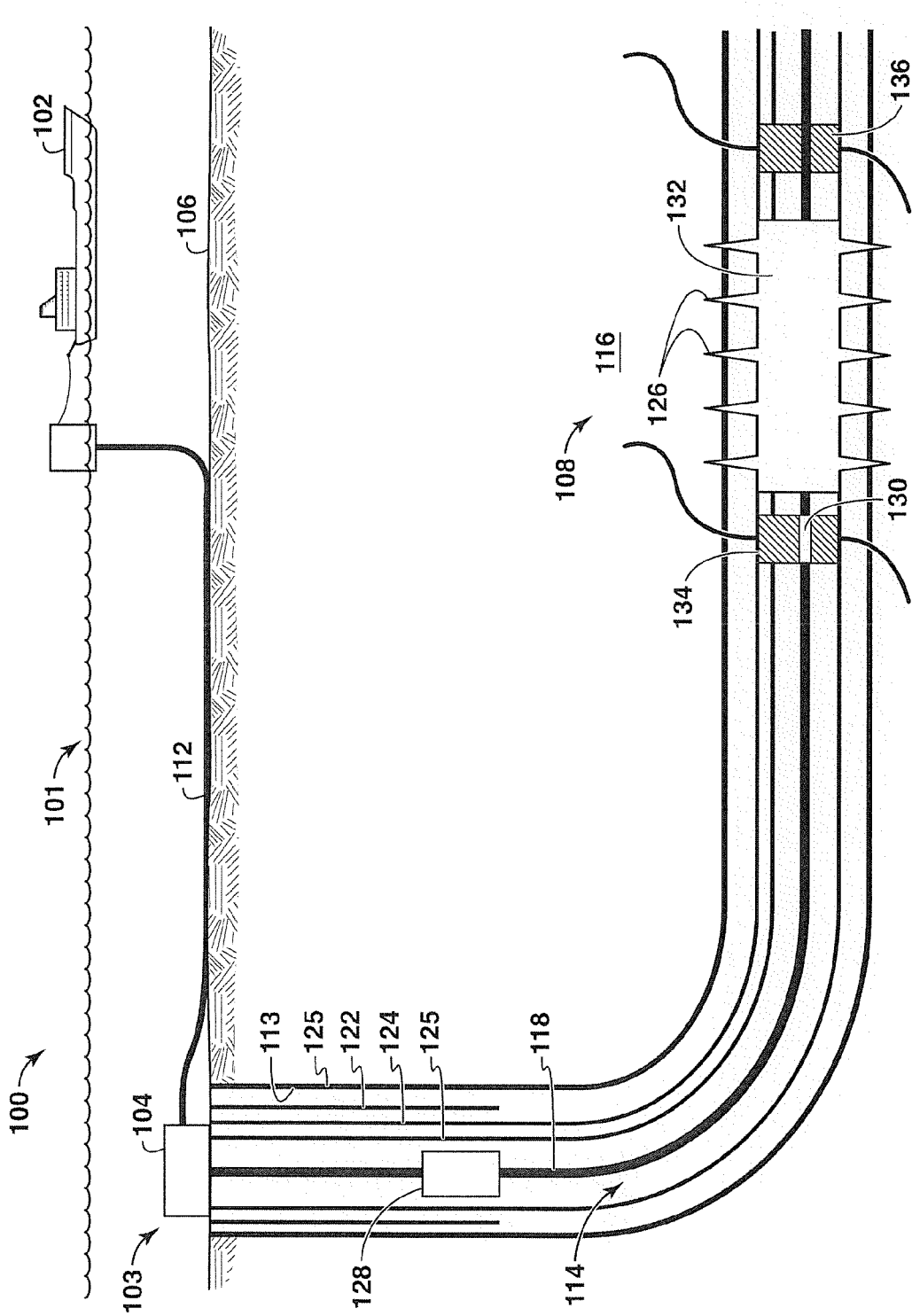
FIG. 1 is an illustrative hydrocarbon production system provided for background information. The production system includes a well.

The present disclosure is directed to methods for generating and/or utilizing discretized physics-based models of subsurface regions, which also may be referred to herein as subsurface domains. By "physics-based," it is meant that the models are created at least in part in response to, and/or are representative of, the fundamental physics of the parameter(s) to be modeled in the subterranean region. These discretized physics-based models may be used for subsurface analysis and/or simulation, and also may be referred to herein simply as being discretized models of subsurface regions. This subsurface analysis and/or simulation may include activities associated with changes within a subsurface region, such as may be experienced during such activities as drilling, extraction, injection, and/or completion of a well within a subsurface region. This subsurface analysis and/or simulation may additionally or alternatively be utilized to predict or otherwise model well operability limits.

The subsurface analysis typically will relate to a subsurface region that includes one or more subsurface features, which often may include a hydrocarbon reservoir. These models of subterranean, or subsurface, regions may include physics-based modeling of subsurface formations and features, fluids, properties, and related parameters thereof. Illustrative, non-exclusive examples of such fluids include liquid and gaseous hydrocarbons and water. Illustrative, non-exclusive examples of such parameters include temperature, pressure, permeability, porosity, shear and/or strain forces, compaction, fluid properties, subsurface formation properties, in situ reservoir conditions, Poisson's ratio, modulus of elasticity, shear modulus, strength, compressibility, combinations thereof, and the like. Illustrative, non-exclusive examples of such subsurface features include reservoirs, wells and wellbores, well annuli, near-wellbore surfaces and/or near-wellbore formations, subsurface strata, producer fields, stimulated formation structures such as fractures and acid wormholes, and the like.

As used herein, "subsurface" refers to beneath the top surface of any mass of land at any elevation or over a range of elevations, whether above, below, or at sea level, and/or beneath the floor surface of any mass of water, whether above, below, or at sea level. Accordingly, "subsurface" may refer to geologic strata occurring below the earth's surface.

As used herein, "formation" means a subsurface region, regardless of size, comprising an aggregation of subsurface sedimentary, metamorphic, and/or igneous matter, whether consolidated or unconsolidated, and other subsurface matter, whether in a solid, semi-solid, liquid, and/or gaseous state, related to the geological development of the subsurface region. A formation may contain numerous geologic strata of different ages, textures, and mineralogic compositions. A formation can refer to a single set of related geologic strata of specific rock type, or to a whole set of geologic strata of different rock types that contribute to or are encountered in, for example, without limitation, (i) the creation, generation, and/or entrapment of hydrocarbons or minerals and (ii) the execution of processes used to extract hydrocarbons or minerals from the subsurface.

By way of background and to provide an illustrative, non-exclusive example of a subsurface region, a subsurface region 100 and an associated production system 101 is illustrated in FIG. 1. It should be noted that FIG. 1 and the other figures of the present disclosure are intended to present illustrative, but non-exclusive, examples according to the present disclosure and are not intended to limit the scope of the present disclosure. The figures may not be drawn to scale, as they have been presented to emphasize and illustrate various aspects of the present disclosure. In the figures, the same reference numerals designate like and corresponding, but not necessarily identical, elements through the various drawing figures.

In production system 101, a floating production facility 102 is coupled to a well 103 having a subsea tree 104 located on the sea floor 106. To access subsea tree 104, a control umbilical 112 may provide a fluid flow path between subsea tree 104 and floating production facility 102 with a control cable for communicating with various devices within well 103. Through subsea tree 104, floating production facility 102 accesses a subsurface formation 108 that includes hydrocarbons, such as oil and gas. Offshore production system 101 is illustrated for illustrative, non-exclusive purposes, and the present discretized physics-based models and methods for creating and/or using the same according to the present disclosure may be used in connection with the injection, extraction, and/or production of fluids and/or the analysis of reservoirs or other formations at any subsurface location.

To access subsurface formation 108, well 103 penetrates sea floor 106 to form a wellbore 113 bounding a well annulus 114 that extends to and through at least a portion of subsurface formation 108. Subsurface formation 108 may include various layers of rock that may or may not include hydrocarbons and may be referred to as zones. In this example, subsurface formation 108 includes a production zone, or interval, 116. This production zone 116 may include fluids, such as water, oil, and/or gas. Subsea tree 104, which is positioned over well annulus 114 at sea floor 106, provides an interface between devices within well annulus 114 and floating production facility 102. Accordingly, subsea tree 104 may be coupled to a production tubing string 118 to provide fluid flow paths and to a control cable 120 to provide communication paths, which may interface with control umbilical 112 at subsea tree 104.

Well annulus 114 also may include various casings, or casing strings, 122 and 124 to provide support and stability for access to subsurface formation 108. For example, a surface casing string 122 may be installed from sea floor 106 to a location beneath sea floor 106. Within surface casing string 122, an intermediate or production casing string 124 may be utilized to provide support for the walls of well annulus 114. Production casing string 124 may extend down to a depth near or through subsurface formation 108. If production casing string 124 extends to production zone 116, then perforations 126 may be created through production casing string 124 to allow fluids to flow into well annulus 114. Further, surface and production casing strings 122 and 124 may be cemented into a fixed position by a cement sheath or lining 125 within well annulus 114 to provide stability for well 103 and to isolate subsurface formation 108.

To produce hydrocarbons from production zone 116, various devices may be utilized to provide flow control and isolation between different portions of well annulus 114. For instance, a subsurface safety valve 128 may be utilized to block the flow of fluids from production tubing string 118 in the event of a rupture or break in control cable 120 or control umbilical 112 above subsurface safety valve 128. Further, a flow control valve 130 may be utilized and may be or include a valve that regulates the flow of fluid through well annulus 114 at specific locations. Also, a tool 132 may include a sand screen, flow control valve, gravel packed tool, or other similar well completion device that is utilized to manage the flow of fluids from production zone 116 through perforations 126. Packers 134 and 136 may be utilized to isolate specific zones, such as production zone 116, within well annulus 114.

Figure 2:
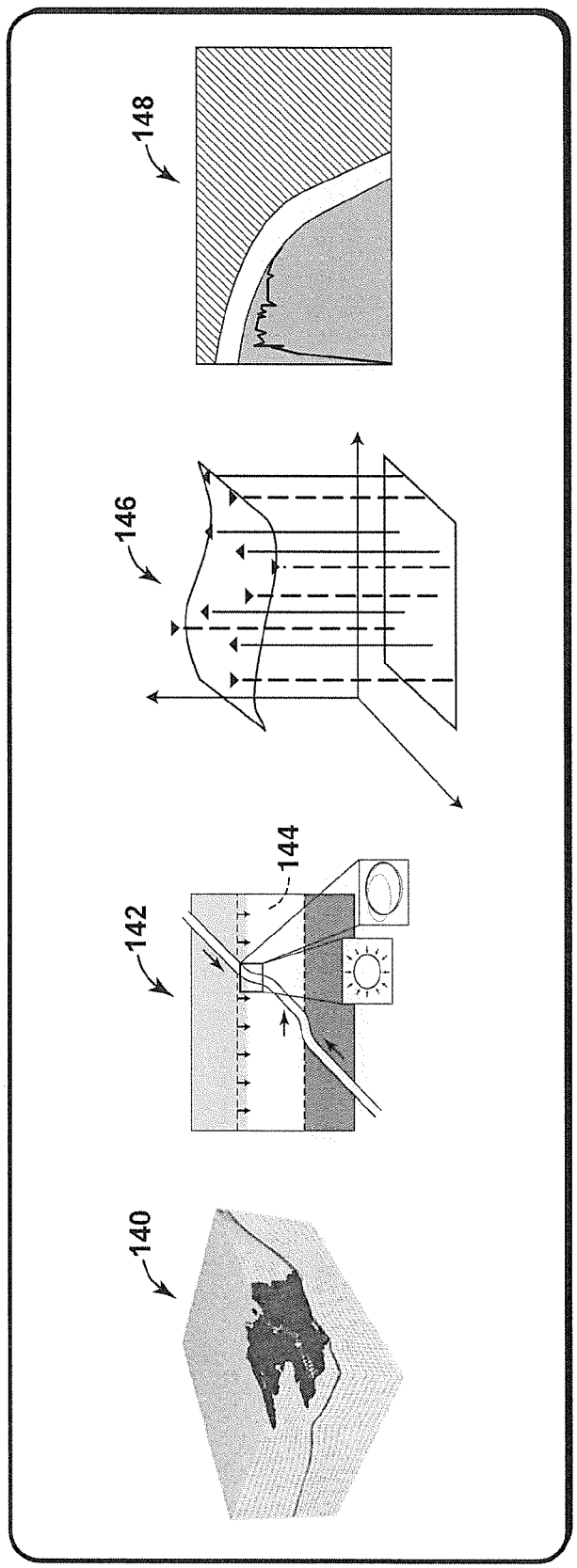
FIG. 2 is a schematic illustration of an actual subsurface region and computational models thereof.

The various phases of well development typically are performed as serial operations that utilize specialized computational models to provide specific information about the subsurface region being modeled, such as well 103, near-well regions, and the like. Full-physics, or full-field, implicit simulation models may be employed to account for the parameters that affect the subsurface region(s) being modeled, including formation(s) and/or subsurface feature(s) therein. This is schematically illustrated in FIG. 2, in which a subsurface region is indicated at 140 and a full-physics model of the subsurface region is indicated at 142. The full-physics model includes, or is based upon, a discretization, or discretized physics-based model, 144 of the subsurface region that is being modeled. The discretized physics-based model may additionally or alternatively be referred to as a discretized physics-based mesh of the subsurface region. As discussed, this discretized mesh computationally represents the subsurface region being modeled as a continuum of elements and nodes. Also shown in FIG. 2, and as discussed in more detail herein, are a surrogate model 146 that may be created from full-physics model 142, and an application 148 through which users may utilize the full-physics model and/or surrogate model, such as to evaluate and/or predict the responsiveness of subsurface region 140 to changes in one or more parameters, which may include changes in design, space, and/or state variables.

Figure 3:
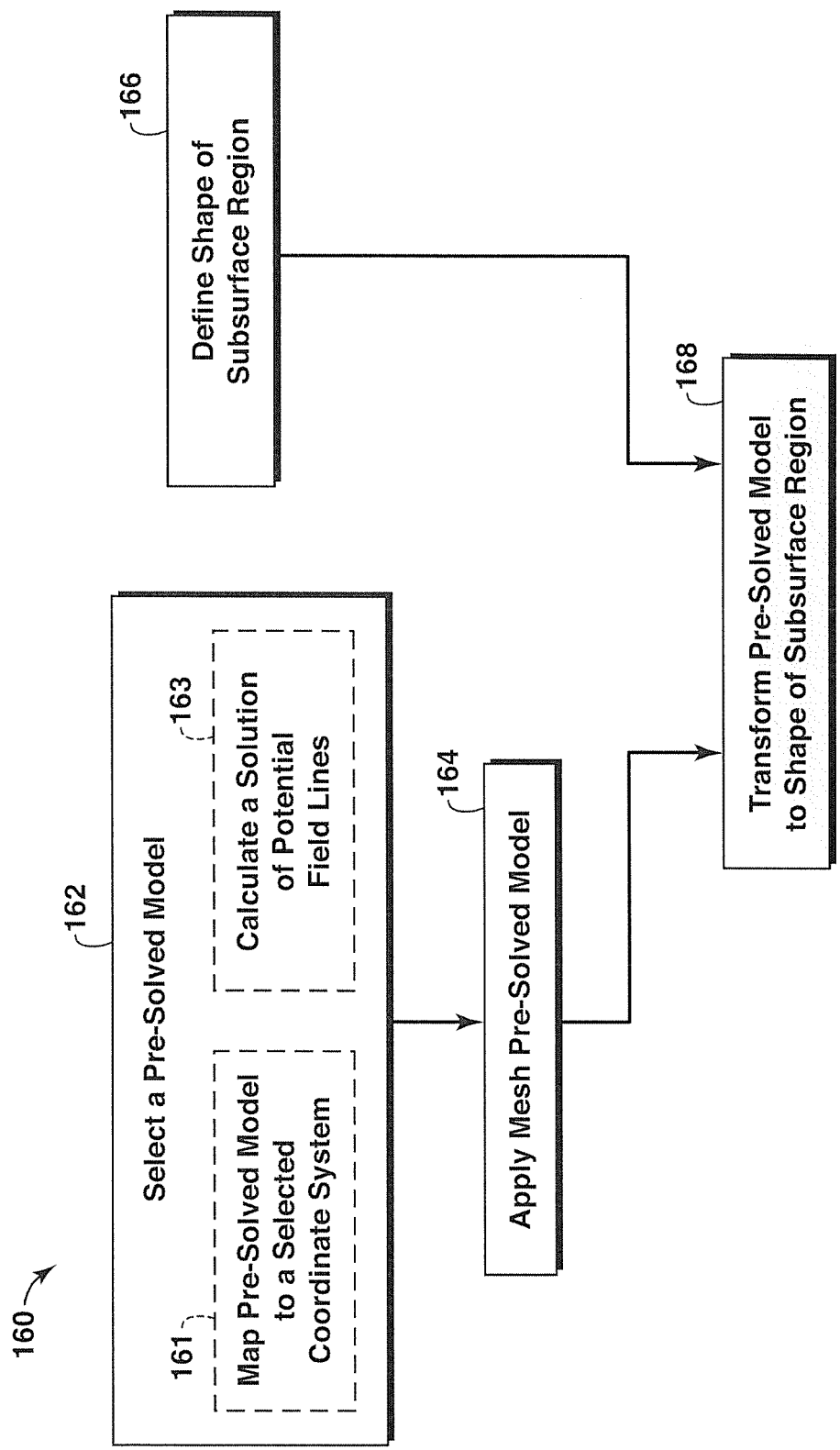
FIG. 3 is a flow chart of illustrative, non-exclusive methods for generating discretized physics-based models of subsurface regions according to the present disclosure.

FIG. 3 is a flow chart of illustrative, non-exclusive examples of methods 160 for creating discretized physics-based models of subsurface regions according to the present disclosure. As indicated, respectively, at 162, 164, 166, and 168, the methods include selecting a pre-solved model, assigning a structured mesh to the pre-solved model, defining the shape of the subsurface region, and transforming the pre-solved model (along with the applied mesh) to the shape of the subsurface region. Each of these steps, or procedures, is discussed in more detail herein.

The selecting of the pre-solved model involves selecting an existing solution, or physics-based model, of subsurface physics, such as may be exhibited in a subsurface region. As discussed, these physics-based models may be used to simulate and/or predict changes of one or more parameters in a subsurface region. Illustrative, non-exclusive examples of such variables include fluid pressures, fluid flow rates, temperatures, stresses, and the like.

It is within the scope of the present disclosure that the pre-solved model may be a pre-solved idealized model. By this it is meant that the pre-solved model may not be derived from, or based upon, a particular subsurface region. Instead, such a pre-solved idealized model may express or otherwise simulate physical, or physics-based, relationships within a generalized or theoretical subsurface domain. Such pre-solved idealized models will often include one or more sources or sinks, such as points, lines, cylinders, and/or spheres, within a surrounding domain, such as a square, rectangular, circular, or spherical outer domain, and typically may be mapped into one or more coordinate systems, such as Cartesian, polar, spherical, and/or elliptical coordinate systems.

Illustrative, non-exclusive examples of such pre-solved idealized models include pre-solved models, or solutions, for single-phase extraction of a liquid (such as water and/or hydrocarbons) from a subsurface domain, single-phase extraction of a gas (such as a gaseous hydrocarbon) from a subsurface domain, radial fluid flow in a subsurface domain, pressure fields within a subsurface domain, stress fields within a subsurface domain, temperature within a subsurface domain, electrostatics within a subsurface domain, poro-elastics within a subsurface domain, and the like. Such models may be used to predict changes in the subsurface domain due to such events as changes in the modeled parameter(s), drilling of a bore hole or other subsurface feature, injection of fluid into the subsurface region, extraction of fluid from the subsurface region, completion of a well in the subsurface region, etc.

A pre-solved model, such as an idealized pre-solved model, may take such illustrative, non-exclusive forms as being a simple source function and domain expression, a pre-solved implicit model, a pre-solved solution to a partial differential equation (or series of such equations) expressing subsurface physics, a solution to an explicit analytical function, etc. Although not required to all embodiments and methods according to the present disclosure, it is within the scope of the present disclosure that the pre-solved model may not be a model of the particular subsurface region to be modeled, or a portion thereof, and/or that the pre-solved model may not have been created from, or based on, the subsurface region to be modeled.

Although not required in all methods and/or models according to the present disclosure, the pre-solved model may be, or have been, created through such illustrative implicit methods as finite element methods, finite volume methods, finite space methods, computational fluid dynamics methods, and/or related grid-based discretization techniques. The following brief discussion will, for the purpose of illustration and not limitation, focus upon the use of finite element techniques to create a pre-solved model. It is within the scope of the present disclosure that these other grid-based, or mesh-based, discretization techniques may have been utilized to create the pre-solved solution that is utilized to create the discretized physics-based models discussed herein.

Finite element analysis allows the analyst to determine the response of the "elements" to changes in the subsurface system. The mathematical model describes how each point or node responds for a given state and/or variable condition. In order to meet this purpose, the variables are initialized at various points within the subsurface region. In such a finite element analysis, a range of variables may be used for modeling a subsurface region, such as a subsurface region containing a reservoir or other subsurface feature. These models can then be used to analyze and/or predict the effect of changes to one or more modeled (i.e., preselected) variables of the subsurface region. For fluid flow modeling, such parameters may include permeability, pressure, reservoir size, and/or temperature. For geomechanical modeling, such parameters may include various properties, such as Poisson's ratio, the modulus of elasticity, shear modulus, Lame constant, or combinations thereof. Such analyses utilize numerical methods to represent an approximate numerical solution to a complex differential equation or series of differential equations.

In finite element modeling, the region that is to be analyzed is broken up into sub-regions called elements. The process of dividing a production area under study into sub-regions may be referred to as "discretization" or "mesh generation." A mesh is a collection of elements that fill a space, with the elements being representative of a system which resides in that space. In finite element modeling, the region that is to be analyzed is represented by functions defined over each element. This generates a number of local functions that are less complicated than those which would be required to represent the entire region.

In traditional finite element methods, solutions are sought at nodal locations along element edges, or within elements, with such elements forming a continuum of elements representative of a subsurface region. Traditional approaches to simulate subsurface regions include placing elements throughout the subsurface region, such as including not only the exterior boundaries thereof, but also along any interior boundaries thereof and/or subsurface features within the subsurface region. The elements are connected at nodes placed along the edges forming the elements. Each node has at least one unknown variable, and thus may be described as being mathematically provided with one or more degrees of freedom. The nodes additionally or alternatively may be referred to as "Gaussian integration points." The number of unknown field variables at a node represents the number of degrees of freedom at that node. A group of functions is chosen to assist in the interpolation process. Because these functions are based upon the geometry or shape of the elements selected, an interpolation function may also be called a shape function. In most cases, a polynomial interpolation function is used.

While it is within the scope of the present disclosure that the pre-solved model may be an idealized model, the pre-solved model additionally or alternatively may be selected and/or configured to be a variant of the subsurface region to be modeled. For example, the pre-solved model may represent a simplified, generalized, or other variant of the physics to be modeled in the subsurface region. In other words, the pre-solved model will not itself accurately model, or simulate, the subsurface region to be modeled, at least because the pre-solved model does not correspond to the boundaries of the subsurface region. As discussed herein, these boundaries may include exterior and/or interior boundaries, including boundaries resulting from one or more subsurface features present in the subsurface region.

It is also within the scope of the present disclosure that the pre-solved model may be a previously created model of the subsurface region to be modeled, or a portion thereof. Specifically, when a change occurs in the subsurface region, previously created and/or solved models that once were accurate may no longer be accurate due to this change in the subsurface region. As such, these existing models may no longer be able to be reliably used to simulate, analyze, or otherwise model the subsurface region. Illustrative, non-exclusive examples of such a "change" include a change in the shape of the subsurface region to be modeled, such as a change to the exterior and/or interior boundaries thereof, a change to an existing subsurface feature, and/or the introduction of a new subsurface feature. As illustrative, non-exclusive examples of this latter "change," a borehole may be extended, a fracture may be formed or extended, a new borehole may be introduced, etc. These changes may render the existing discretized physics-based solution to no longer be sufficiently representative of the subsurface region to be used to accurately simulate and/or predict future changes in the subsurface region.

It is within the scope of the present disclosure that the selecting of the pre-solved model may include selecting the pre-solved model from a database, or other repository or source, containing a plurality of pre-solved models. When such a database exists, the selecting may include selecting a pre-solved model that closely (and/or most closely relative to the rest of the plurality of pre-solved models) represents the physics to be modeled in the subsurface region. It is further within the scope of the present disclosure that discretized physics-based models created according to the present disclosure may be stored in such a database or other storage medium for later use when a new discretized physics-based model is to be created, such as by using methods according to the present disclosure. This selection of a pre-solved model from a database containing a plurality of pre-solved models may be performed via any suitable mechanism. Illustrative, non-exclusive examples include manual and/or computerized selection mechanisms, with computerized selection mechanisms including, but not being limited to, automated selection mechanisms.

Figure 5:
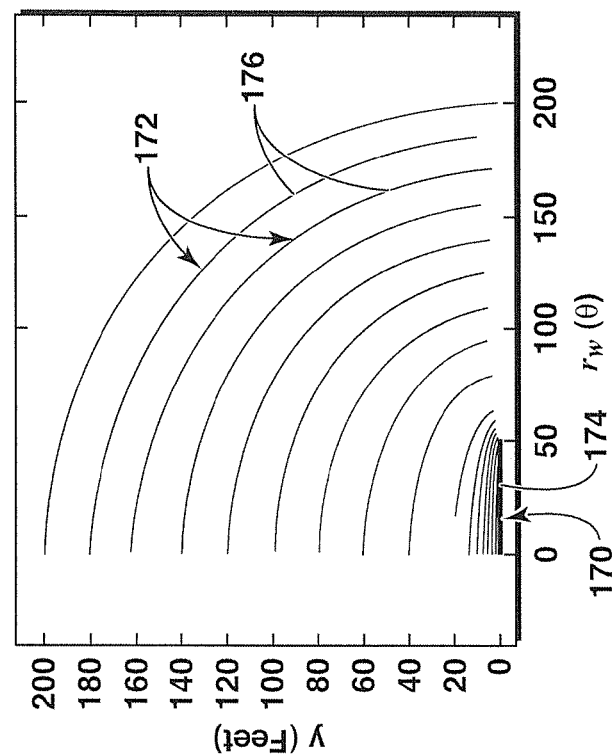
FIG. 5 is a graph illustrating another illustrative, non-exclusive example of a solution of potential field lines for a pre-solved model that may be used according to methods according to the present disclosure.
Figure 4:
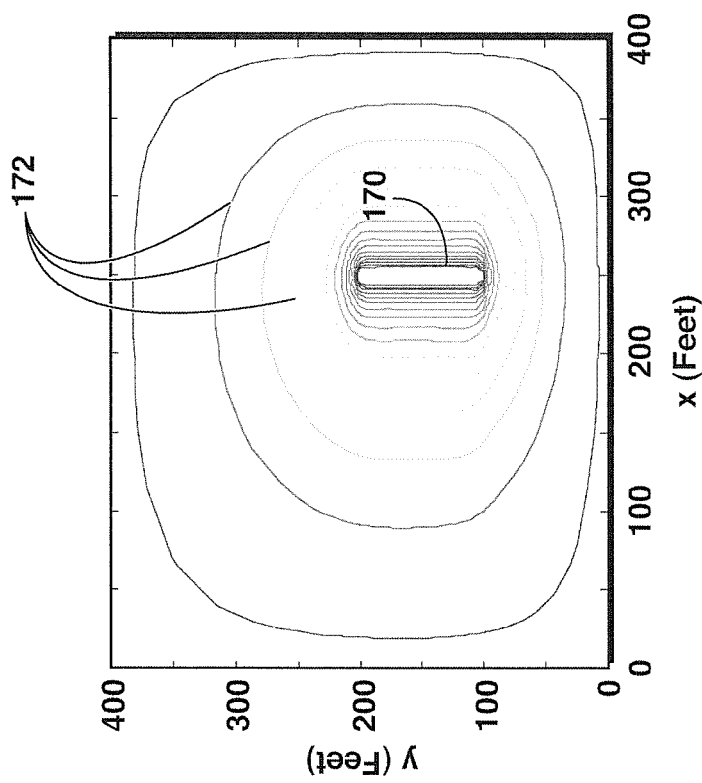
FIG. 4 is a graph illustrating an illustrative, non-exclusive example of a solution of potential field lines for a pre-solved model that may be used according to methods according to the present disclosure.

The pre-solved model may provide for, include, and/or define, a solution of potential field. The potential field lines may additionally or alternatively be referred to herein as iso-lines or iso-potential lines. An illustrative, non-exclusive example of such a pre-solved model is shown in FIG. 4. In FIG. 4, the pre-solved model is represented, or mapped, on a Cartesian coordinate system, and includes a central source 170 and potential field lines 172. As a more particular illustrative, non-exclusive example, when the pre-solved model simulates pressure within a subsurface region, the potential field lines may be referred to as pressure field lines, iso-pressure lines, or isobaric lines. It follows that analogous, more specific, references to the potential field lines may be expressed to field lines representing constant temperatures, forces, porosity, etc. FIG. 5 provides an illustrative graphical example of a pre-solved model in the form of a pressure field solution that is mapped to a cylindrical domain with a centered source 170 in the form of a fracture 174. In FIG. 5, the potential field lines 172 represent iso-pressure lines 176.

It is within the scope of the present disclosure that the selecting of the pre-solved model may include the steps of mapping the pre-solved model to a selected coordinate system and/or calculating a solution of potential field lines for the pre-solved solution. These steps are illustrated in FIG. 3 at 161 and 163 and may be described as being optional steps, as the selected pre-solved model may already be mapped to a suitable coordinate system and/or include a suitable solution of potential field lines.

As used herein, references to such relative terms as "acceptable," "suitable," "sufficiently representative" are intended to acknowledge and represent that particular uses and/or implementations of methods according to the present disclose will inherently include user-selected design choices that may affect the accuracy, complexity, variables, domains, etc. that may differ from other uses and/or implementations of methods according to the present disclosure. That being said, these models and implementations are still within and comply with the methods disclosed herein.

It is also within the scope of the present disclosure that a pre-solved model may not be available that is representative, or sufficiently representative, of the physics to be modeled in the subsurface region. As an illustrative example, a pre-solved model may not be available that itself corresponds to, or is otherwise representative of, the shape of one or more subsurface features within the subsurface domain to be modeled. In such a situation, the selecting of the pre-solved model may include creating the pre-solved model from a composite of two or more pre-solved models and/or two or more solutions (such as solutions of potential field lines) from one or more pre-solved models.

As an illustrative, non-exclusive example, a plurality of solutions of potential field lines generated from one or more pre-solved models may be merged, integrated, or otherwise combined to form a composite potential field solution. The resulting composite potential field solution may additionally or alternatively be referred to as a synthetic potential field solution, a solution of synthetic potential field lines, and/or a solution of composite field lines. As a further illustrative, non-exclusive example, a synthetic potential field solution may be generated by using two or more surface functions or other pre-solved models, from which composite potential field lines may be approximated or otherwise calculated or generated. By parameterizing the surface functions (or other pre-solved models, if necessary), a morphing, or weighting, function may be created to define transitions between the shapes of the potential field lines of the individual surface functions, such as a function of the distances between the surfaces.

Figure 6:
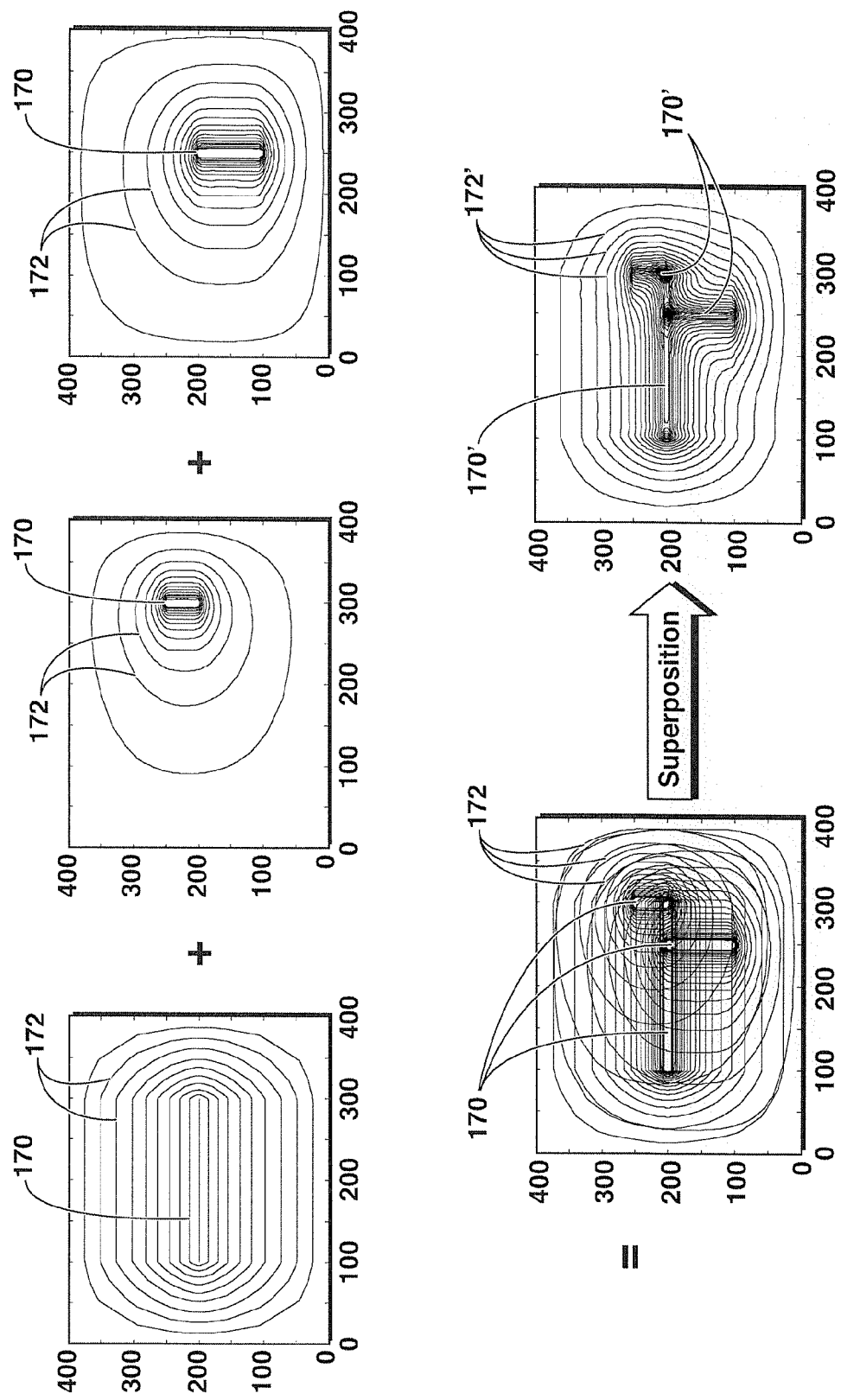
FIG. 6 is a diagram illustrating the creation of a composite solution of potential field lines from three individual solutions of potential field lines.

FIG. 6 provides a graphical illustration of an illustrative, non-exclusive example of such a process for creating a composite, or synthetic, solution of potential field lines. In FIG. 6, composite potential field lines are indicated at 172' and generated from the potential field lines 172 from three solutions of potential field lines for pre-solved models that include an elliptical source, or central feature, 170 within a common rectangular domain. A composite source 170' is also shown and is formed from a composite of the individual sources 170. As the illustrative, non-exclusive example shown in FIG. 6 demonstrates, this composite of two or more pre-solved models and/or two or more solutions of one or more pre-solved models may be used to create a composite pre-solved model that more closely represents an actual subsurface region to be modeled. By this it is meant that this process may be utilized to approximate or otherwise represent more complicated subsurface features. As illustrated in FIG. 6, the simple addition of the three solutions results in a relative complex solution or representation, as in the bottom left of FIG. 6. However, the complexity can be resolve through superpositioning to approximate the more complicated subsurface features. Once created, the composite potential field solutions and/or the composite pre-solved model used to generate these potential field lines may be stored, such as in a suitable database, for later use.

Figure 7:
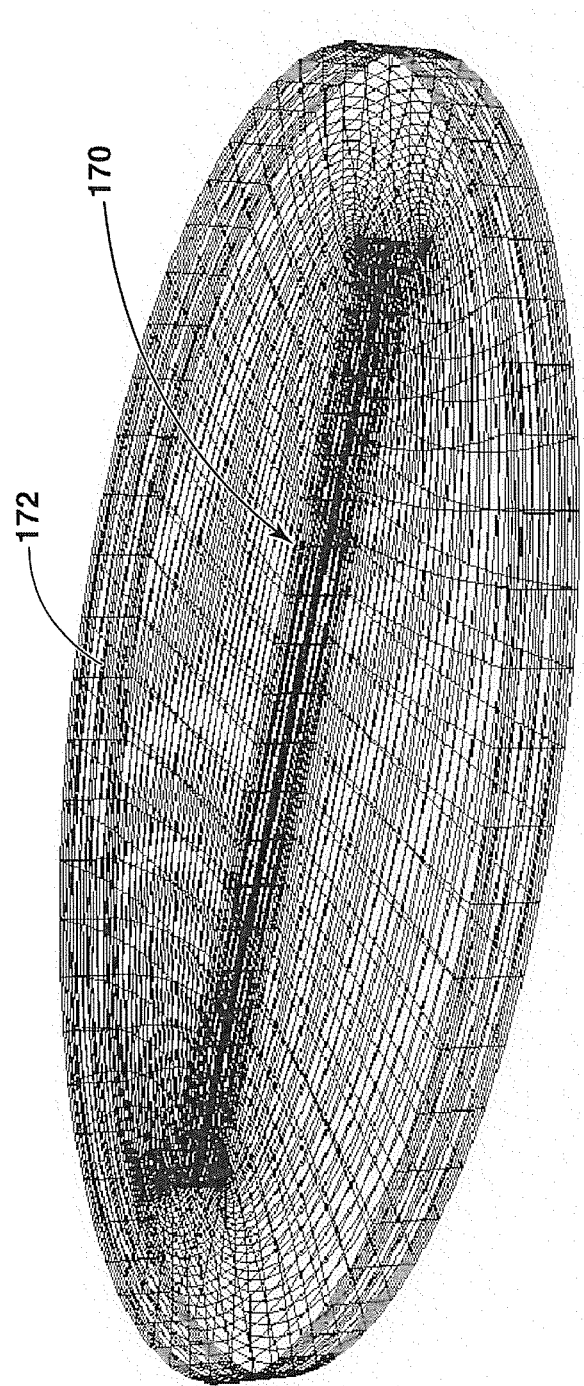
FIG. 7 is a diagram illustrating a mesh applied to the solution of potential field lines of a pre-solved model from FIG. 5.

As discussed in connection with FIG. 3, methods for creating discretized physics-based models according to the present disclosure include applying, or assigning, a mesh to the pre-solved model. This mesh may take any suitable form for the discretized physics-based model to be created, but it will often be a regular and structured mesh, and in many cases, an orthogonal mesh. The application of the mesh to the pre-solved model may additionally or alternatively be described as applying a mesh (such as a regular, structured, and/or orthogonal mesh) to the solution of potential field lines for the pre-solved model. An illustrative graphical representation of such an example is shown in FIG. 7 and presents the solution of potential field lines 172 from FIG. 5 with an orthogonal mesh applied thereto. The illustration of FIG. 7 also includes a representation of the central source 170.

The application of the mesh to the pre-solved model, such as to the solution of potential field lines thereof, may be described as forming an intermediate model. As discussed in more detail herein, the discretized physics-based model of a particular subsurface region may be produced from the intermediate model upon transforming the intermediate model to the shape of the subsurface region. The intermediate model may be described as containing an n-dimensional array of points, or nodes, in which a plurality of elements are defined to create a structured continuum of elements. Methods according to the present disclosure may include identifying, or specifying, such a plurality, or "cloud," of such points distributed throughout the domain of the intermediate model.

As indicated in FIG. 3 at 166, methods according to the present disclosure include defining the shape of the subsurface region to be modeled. It is within the scope of the present disclosure that this defining of the shape of the subsurface region may occur prior to, current with, or after the previously discussed selecting and applying steps. Defining the shape of the subsurface region may additionally or alternatively be referred to as defining the boundaries, or the physical boundaries, of the subsurface region to be modeled. This defining of the shape of the subsurface region to be modeled may include defining the exterior boundaries and/or any interior boundaries of the subsurface region. These boundaries may include defining the shape, or boundaries, of one or more subsurface features within the subsurface domain to be modeled.

Defining of the shape of the subsurface region to be modeled may include, or be described as, mathematically defining the shape (or boundaries) of the subsurface region. Any suitable mechanism and/or tool may be used to define the shape of the subsurface region. This may include determining surface functions that mathematically define the shape of the subsurface region. Illustrative, non-exclusive examples of suitable mechanisms include the use of computer-aided design (CAD) software, computer-implemented mapping tools, and the like.

Figure 8:
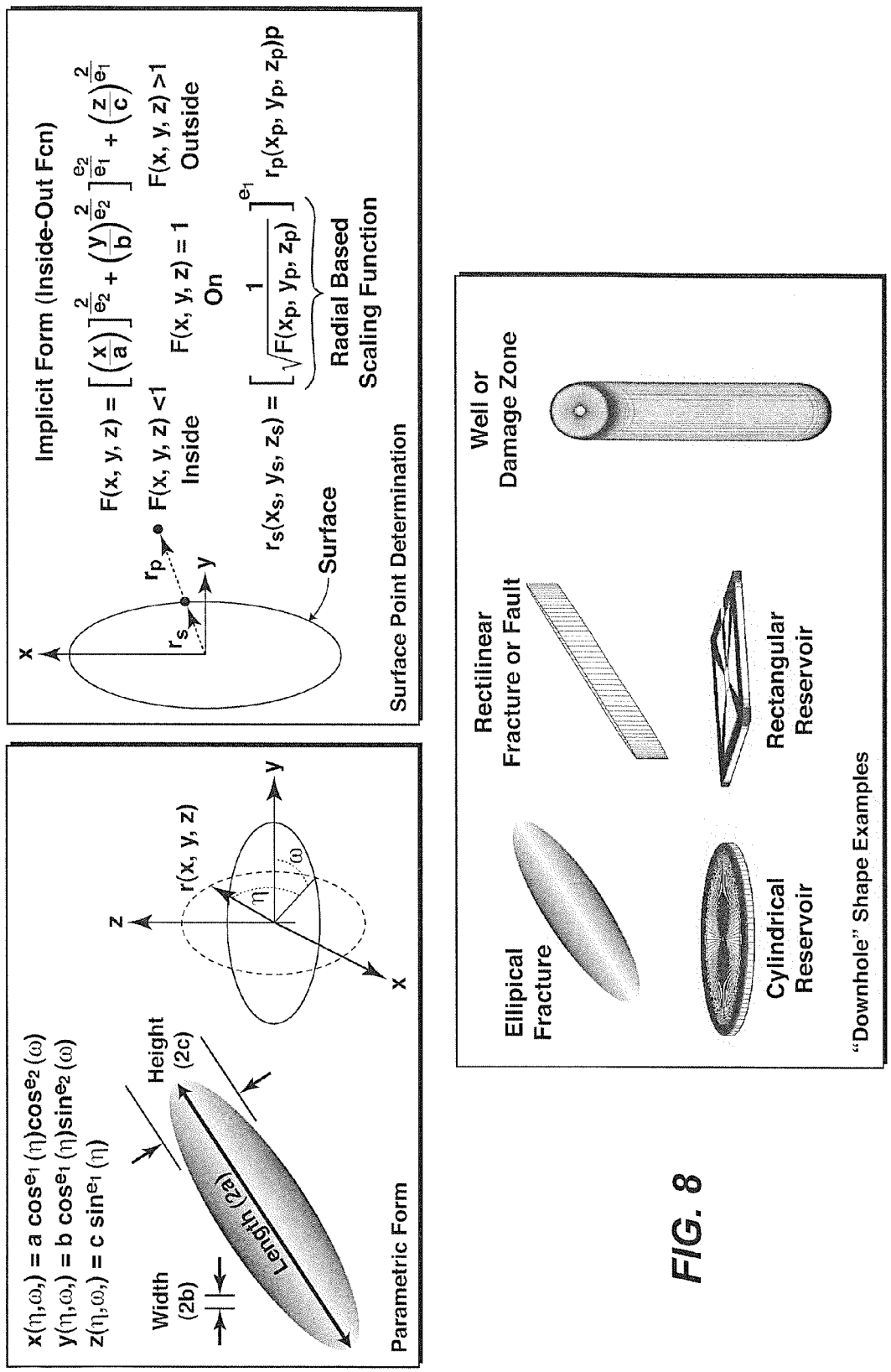
FIG. 8 is a diagram illustrating how supershapes may be used to mathematically define or otherwise represent subsurface features that may be present in a subsurface region to be modeled.

Although not required to all methods and/or models according to the present disclosure, an illustrative, non-exclusive example of a method for defining the shape of the subsurface region to be modeled is to use at least one supershape to define this shape of the subsurface region. Illustrative, non-exclusive examples of supershapes are superellipses and superellipsoids. FIG. 8 is a diagram illustrating how supershapes may be used to mathematically define or otherwise represent subsurface features that may be present in a subsurface region to be modeled.

For some subsurface regions, the shape of the subsurface region may be defined mathematically with one supershape. However, and analogous to the prior discussion of creating a composite solution of potential field lines, the shape of the subsurface region may be defined mathematically by a plurality of supershapes, and/or expressions thereof. The use of supershapes to define mathematically the shape of the subsurface region to be modeled may, but is not required to, provide this mathematical definition in a more efficient manner than if conventional surface functions are utilized to do so.

Figure 9:
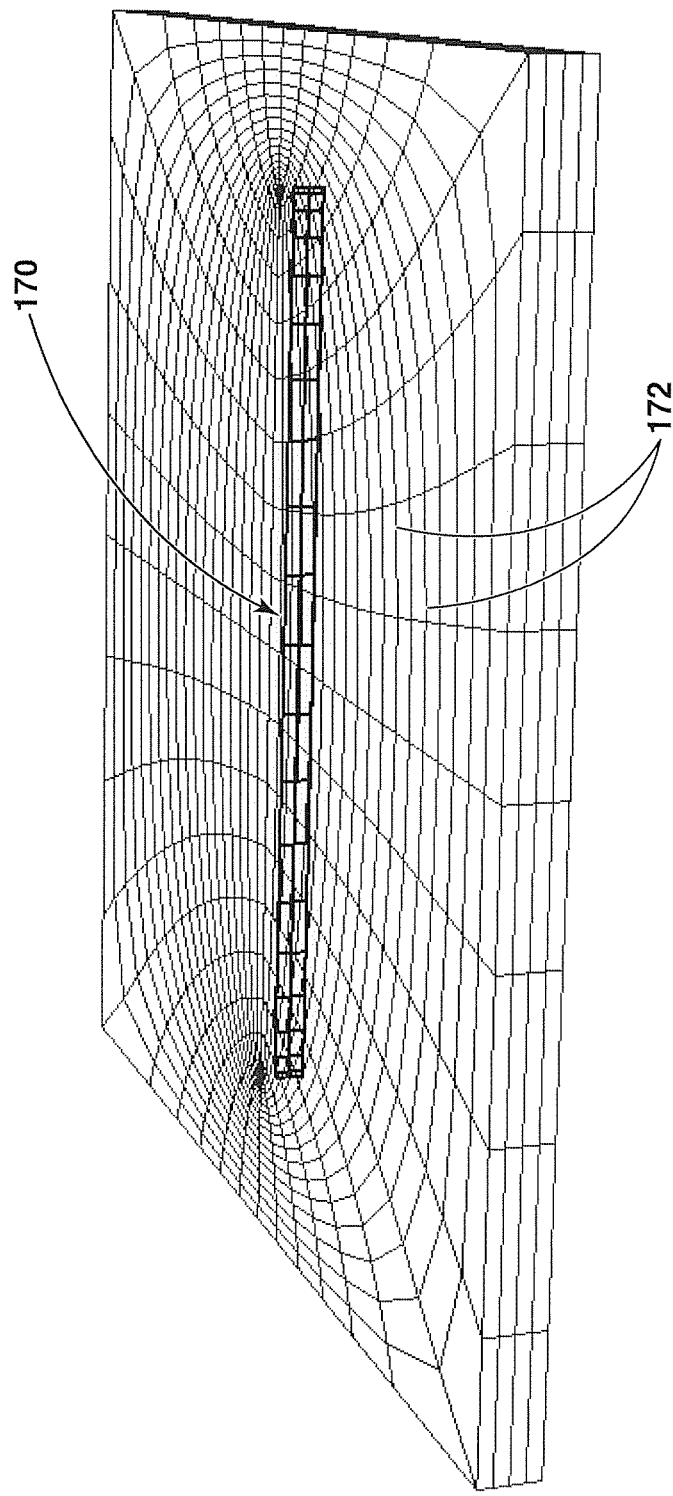
FIG. 9 illustrates a discretized physics-based model of a subsurface region created according to the present disclosure.
Figure 10:
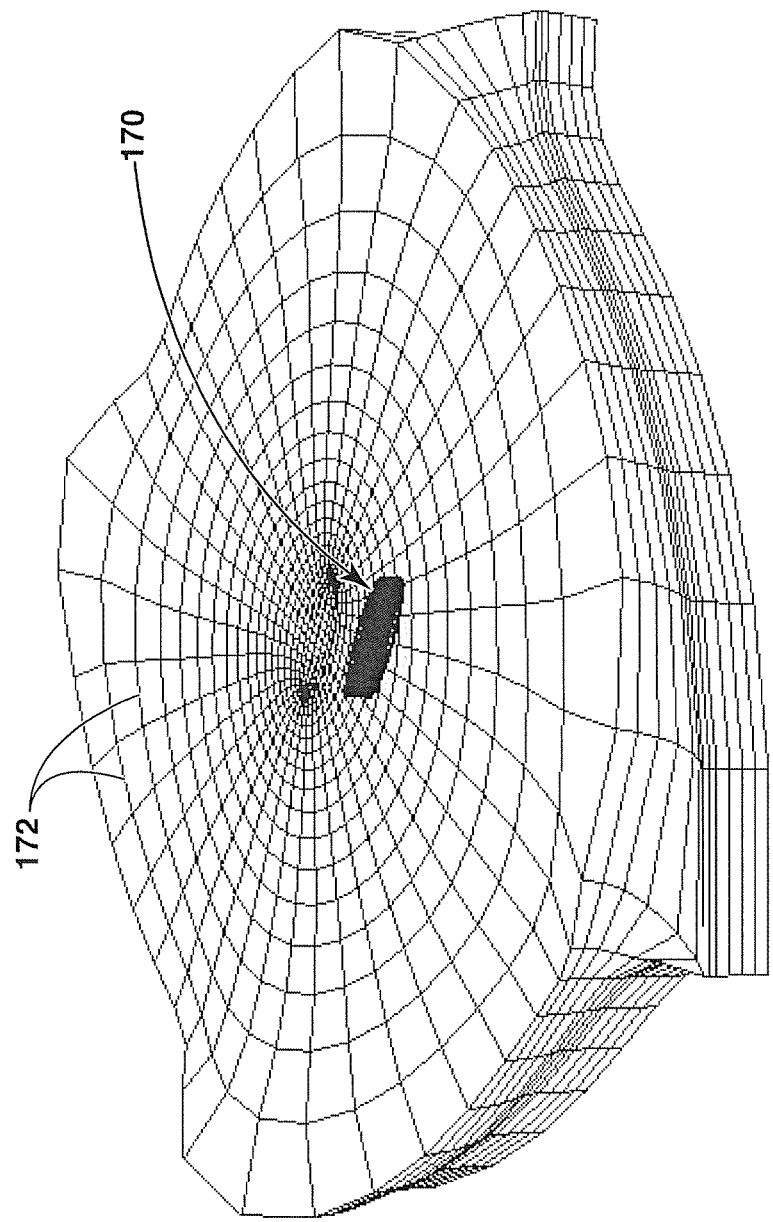
FIG. 10 illustrates a discretized physics-based model of a subsurface region created according to the present disclosure.

After the mesh is applied to the pre-solved model and the shape of the subsurface region is defined, the discretized physics-based model may be created by transforming the pre-solved model to the shape of the subsurface region, such as is indicated at 168 in FIG. 3. For example, this may be accomplished by transforming the intermediate model created by the application of the mesh to the solution of potential field lines of the pre-solved solution to the shape of the subsurface region. This transforming may additionally or alternatively be referred to as stretching, such as stretching of the intermediate model or pre-solved model to the shape of the subsurface domain. Ideally, at least a substantial portion of the regularity or orthogonality of the mesh is preserved during this transforming process, with the resulting continuum of elements exhibiting smooth transitions between adjacent elements. FIGS. 9 and 10 provide illustrative, non-exclusive examples of the intermediate model of FIG. 7 transformed to the shape of a subsurface region to be modeled. As with FIG. 7, FIGS. 9 and 10 include representations of the central source 170 and potential field lines 172. In FIG. 9, the intermediate model is transformed to a square domain, whereas in FIG. 10 the intermediate model is transformed to the shape of an arbitrary domain.

It is within the scope of the present disclosure that the discretized physics-based model will not exhibit complete orthogonality between elements. As illustrative, non-exclusive examples, the intersections of a majority of the elements (and optionally, a substantial majority, such as at least 70%, at least 80%, at least 90%, or at least 95% of the elements) in the discretized physics-based model may be within the range of 75-105 degrees, 80-100 degrees, or even 85-95 degrees. It is further within the scope of the present disclosure that some of the intersections may be orthogonal, i.e., at 90 degrees.

Any suitable process or technique may be utilized to provide this transforming step. Illustrative, non-exclusive examples of suitable techniques include using one or more of projections, conformal mapping, and level sets techniques, or procedures. In some methods according to the present disclosure, it may be desirable to utilize a less time-intensive and/or computationally intensive process to provide this transforming. Additionally or alternatively, in some methods according to the present disclosure, an explicit and/or feed-forward method may be utilized to provide this transforming.

An illustrative, non-exclusive example of such a transforming method involves using an elastic finite element analysis with a relaxation in the step-size requirement and/or with only a limited number of iterations. As illustrative, non-exclusive examples, less than ten iterations, less than five iterations, two iterations, or even a single iteration may be utilized, although it is also within the scope of the present disclosure that ten or more iterations may be utilized.

A further illustrative, non-exclusive example of a method for performing the transforming step is to use a hyperelastic strain deformation calculation, or process, to transform, or stretch, the intermediate model to the shape of the subsurface region to be modeled with the discretized physics-based model. In such an application, the intermediate model (and/or the solution of potential field lines to which the mesh has been applied) is used as an initial configuration, the (mathematically) defined shape of the subsurface region is used as the final configuration, and a negative Poisson ratio is utilized, or assigned, so that the intermediate model expands, or fills out, in all directions as it is stretched or otherwise transformed.

It is within the scope of the present disclosure that the transforming step may include repositioning and/or superpositioning one or more nodes of the discretized physics-based model. If so, any suitable method may be utilized to provide this repositioning/superpositioning, such as an interpolative responsive function, such as a kriging or radial basis function.

After the discretized physics-based model is created, such as in accordance with any of the methods described and/or illustrated herein, the model may then be used, or applied. This is graphically illustrated in FIG. 11, in which the methods for creating the discretized physics-based models 144 of a subsurface region are collectively indicated at 160, and illustrative, non-exclusive applications, or uses, of the discretized physics-based model are generally indicated at 148.

As indicated at 202, and as previously discussed, the discretized physics-based model may be stored. As indicated at 204, the discretized physics-based model may be solved, such as for particular variable values and/or ranges of values. This solving step may additionally or alternatively be described as generating a full-physics and/or fine-scale model 142 of the subsurface region from the discretized physics-based model of that subsurface region. As indicated at 206, the discretized physics-based model may be displayed, such as to an analyst, engineer, or other operator. As indicated at 208, the discretized physics-based model may be used to analyze, predict, simulate, and/or control events in the subsurface region, such as drilling, extraction, injection, and/or completion associated with a well in the subsurface region. Expressed in slightly different terms, the modeled subsurface region may be analyzed and/or operations may be performed therein (such as drilling, extracting, injecting, and/or completing) responsive at least in part to use of the discretized physics-based model. As indicated schematically with double-headed arrows in FIG. 11, the full-physics model also may be displayed, stored, and/or used according to the present disclosure.

Even with the use of the methods of the present disclosure, it may not always be practical to conduct different studies or to otherwise utilize the resulting full-physics models that may be created from the discretized physics-based models. For example, it may not be practical to generate a solution from the discretized physics-based model for all applications and/or situations that may be of interest. While it is certainly within the scope of the present disclosure to utilize these solutions when desirable or possible, it is by no means a requirement.

Accordingly, surrogate representations, or models, of the full-physics model may be generated. This is graphically indicated at 210 in FIG. 11. Surrogate modeling refers to the creation of representations of full-physics, or fine-scale, computer models, which may be produced from the discretized physics-based models described herein. Surrogate models are explicit mathematical functions that emulate, or mimic, the responses of full-physics models with high accuracy, but which are able to generate responses in a fraction of the time required to generate a response from the full-physics model from which the surrogate model was generated. As used herein, "surrogate model" refers to a mathematical model that seeks to predict, such as by interpolating or extrapolating a response, or output, based on output values previously acquired from empirical observation and/or mathematical calculations, including calculations using an existing full-physics model. Surrogate models additionally or alternatively may be referred to as surrogates, surrogate representations, surrogate response models, surrogate modeling systems, surrogate functions, response surface models, metamodels, and/or emulators.

As illustrative, non-exclusive examples, surrogate models may be useful tools for field personnel and other users who may lack the time, expertise, and/or computational resources to utilize fine-scale computer models. As such, surrogate models have proven to be useful for real-time, in-field analysis and decision-making. Illustrative, non-exclusive examples of conventional surrogate models may be found in U.S. Pat. No. 4,759,636, and U.S. Patent Application Publication Nos. 2006/0160137 and 2007/0094187, the complete disclosures of which are hereby incorporated by reference herein.

Figure 11:
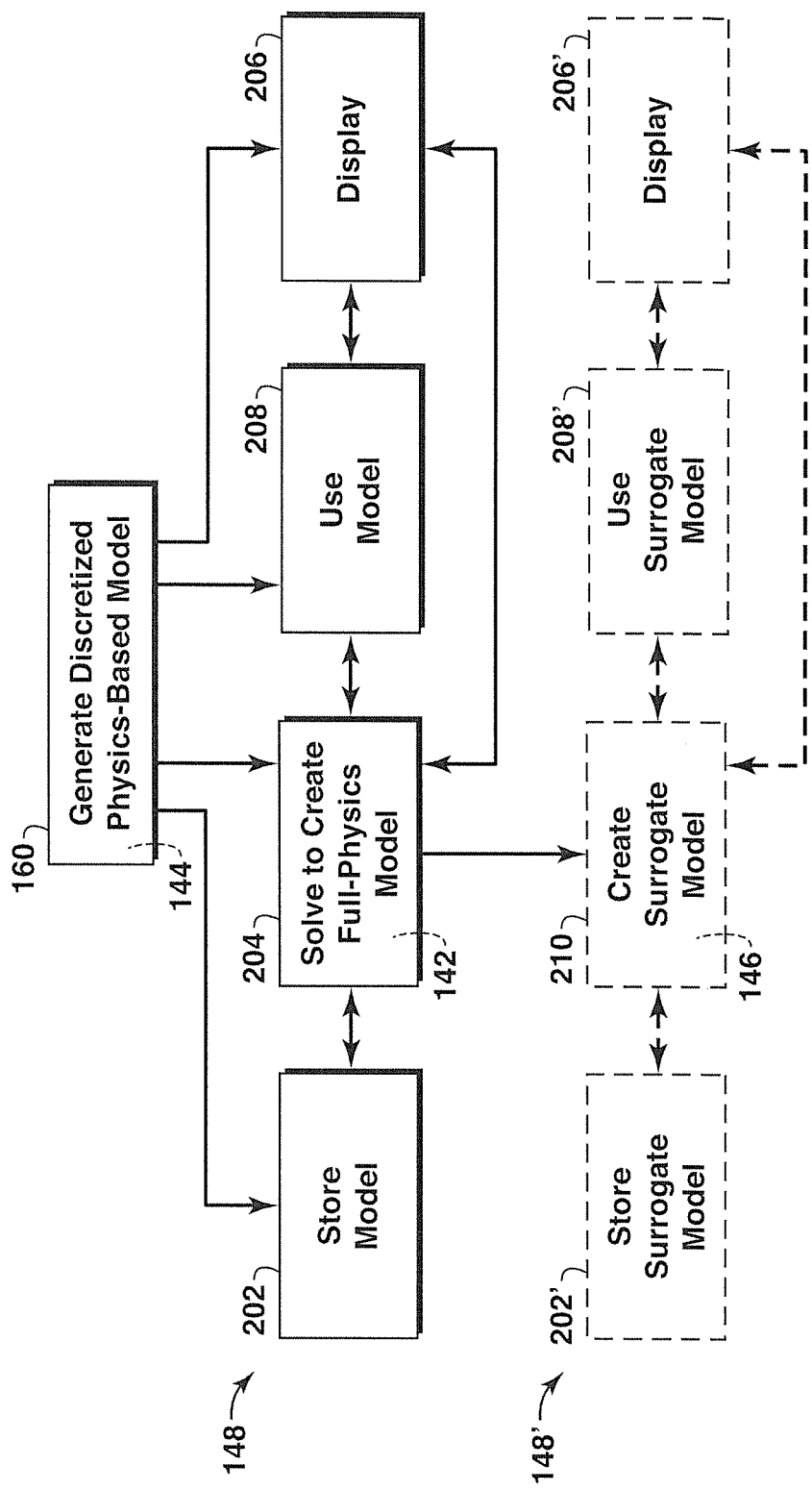
FIG. 11 is a flow chart illustrating illustrative, non-exclusive examples of additional methods and applications for using discretized physics-based models of subsurface regions according to the present disclosure.

As indicated in dashed lines in FIG. 11, it is within the scope of the present disclosure that one or more surrogate models 146 may be generated from a full-physics model 142.

Analogous to the preceding discussion of applications 148 of the discretized physics-based models 144, the surrogate models also may be applied or otherwise used, such as indicated at 148'. Illustrative, non-exclusive examples of such uses, or applications, may include storing 202', displaying 206', and/or using 208' the surrogate model.

Discretized physics-based models (and solutions thereof to form full-physics models) according to the present disclosure may be created and/or utilized for a wide variety of applications and uses. As illustrative, non-exclusive examples, these models may be generated and/or used to provide explicit responses, or outputs, for geotechnical and/or geomechanical analysis of a subsurface region, such as to evaluate and/or predict stresses and/or strains in a well or other subsurface region. This analysis may be used for such applications as to evaluate well reliability, well productivity, well injectibility, well stimulation, sand production, casing integrity, shear in formation, shear slip, well failure, well fatigue due to cycling, straining, etc. Additional illustrative, non-exclusive examples of applications for using models according to the present disclosure include to evaluate or otherwise predict movement of fluids, such as water and/or hydrocarbons, in a subsurface region and/or to determine the time-varying pressure gradient within a subsurface region. Further illustrative, non-exclusive examples include using models of the pressure and/or fluid flow rate for such well architectures as hydraulically fractured wells, acid stimulated wells, deviated wells, and horizontal wells.

The models according to the present disclosure additionally or alternatively may be utilized to produce and/or extract hydrocarbons from a subsurface region, such as a formation within the subsurface region. For example, the models may be utilized to predict, or evaluate, the behavior and/or the responses of the hydrocarbons or surrounding subsurface features to changes in one or more preselected variables. Hydrocarbons may then be extracted from the subsurface region based at least in part on the responses from the models. This extraction, or production, of hydrocarbons from the subsurface region may include operating the well, and/or related structures, responsive at least in part to the outputs from the models. In some applications, additional wells may even be drilled or otherwise created or modified based at least in part on the responses from the models.

Figure 12:
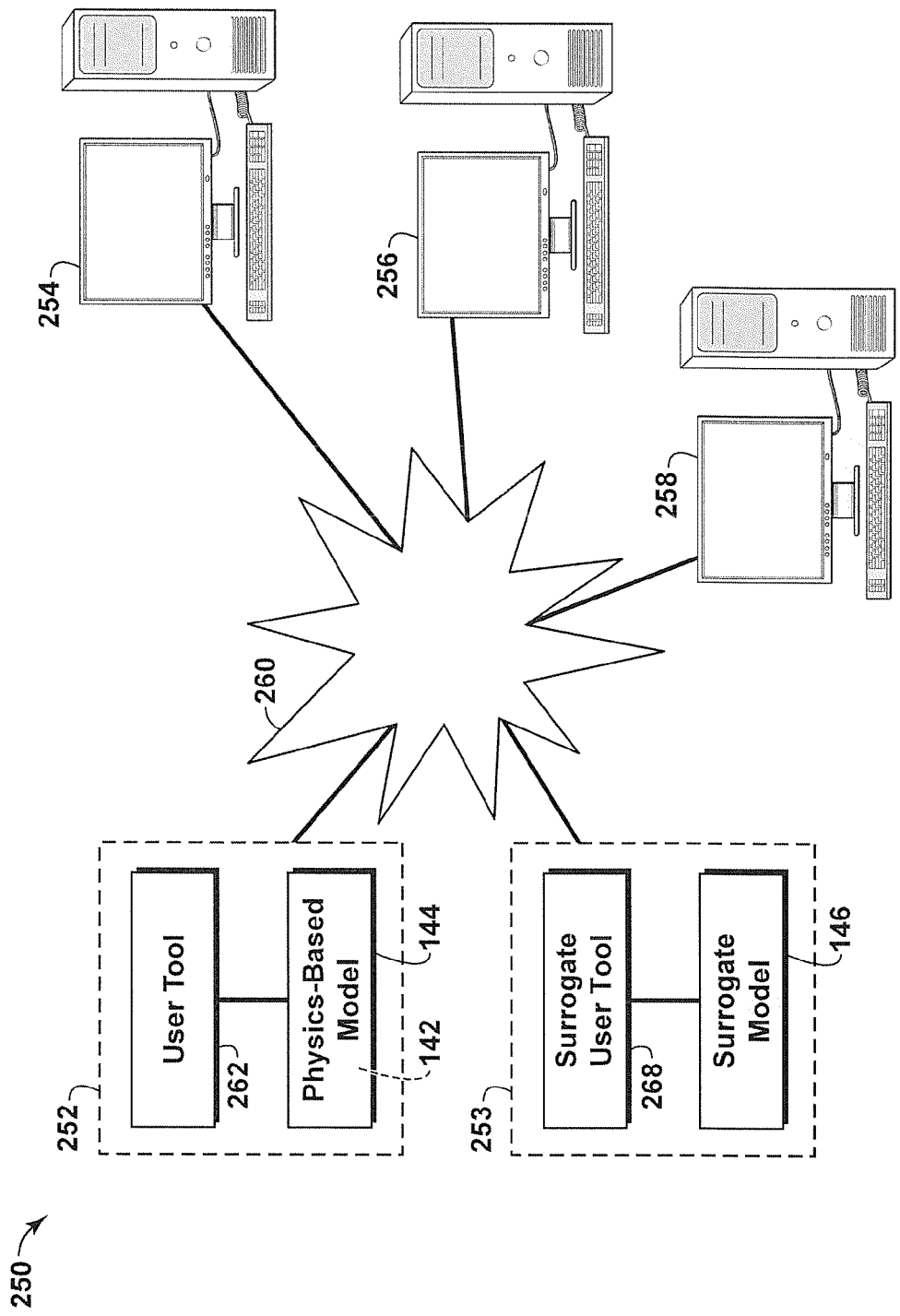
FIG. 12 is an illustrative, non-exclusive example of computer architecture that may be used with certain aspects of the methods and discretized physics-based models of subsurface regions according to the present disclosure.

Discretized physics-based models (and solutions thereof to form full-physics models) according to the present disclosure may be created and/or utilized with a user tool. For example, a user tool may enable the models to be utilized for efficient and accurate modeling of the subsurface region of interest, such as to evaluate, predict, optimize, characterize, and/or otherwise study or utilize the modeled subsurface region. An illustrative, non-exclusive example of a suitable user tool is schematically illustrated in FIG. 12. FIG. 12 schematically depicts a modeling system 250 in accordance with certain aspects of the present disclosure. In this modeling system 250, a first device 252 and a second device 253 may be coupled to various client devices 254, 256, and 258 via a network 260. First device 252 and second device 253 may include a computer, a server, a database or other processor-based device, and the client devices 254, 256, 258 may include laptop computers, desktop computers, servers, or other processor-based devices. Each of these devices 252, 253, 254, 256, and 258 may include a monitor, keyboard, mouse, and/or other user interface components for interacting with the analyst, engineer, field technician, or other operator. Accordingly, such a monitor may be utilized for displaying the models and/or outputs or responses therefrom according to the present disclosure.

Although not required to all embodiments, each of devices 252, 253, 254, 256, and 258 may be located in different geographic locations, such as different offices, buildings, cities, or countries. Accordingly, network 260 may include different devices, such as routers, switches, bridges, or cables for example. Also, network 260 may include one or more local area networks, wide area networks, server area networks, or metropolitan area networks, or combinations of these different types of networks. The connectivity and use of network 260 by devices 252, 253, 254, 256, and 258 operate through the internet, an intranet, or another suitable network communication system using either a wired or a wireless platform.

In a more basic arrangement, system 250 may be implemented without a network 260. In such an arrangement, first device 252 may be loaded onto the second device 253, with second device 253 residing in one or more of devices 254, 256, and 258. The user tool and methods disclosed herein are not limited by the architecture of the modeling system 250 shown in FIG. 12, so long as the system has sufficient memory, operating speed, and user interface components to operate the appropriate software including a user tool 262. It is also within the scope of the present disclosure that the modeling system 250 may be implemented with a single device or with at least a third device.

As schematically illustrated in FIG. 12, first device 252 includes user tool 262. The user tool, which may reside in memory within first device 252, may be an application, for example. This application may display or otherwise provide computer-based representations of a well, wellbore region, formation, or other subsurface region or subsurface feature thereof. An illustrative, non-exclusive example of such a representation includes well 103 of FIG. 1, which as depicted in FIG. 1 is connected to a petroleum reservoir or a depositional basin, such as subsurface formation 108. User tool 262 may be implemented as a spreadsheet, program, routine, software package, or other suitable computer readable software instructions in an existing program, which may be written in a computer programming language, such as Visual Basic, Fortran, C++, Java and the like. The memory storing user tool 262 may be of any conventional type of computer readable storage device used for storing applications, which may include hard disk drives, floppy disks, CD-ROMs and other optical media, magnetic tape, flash drives, solid-state devices, and the like.

User tool 262 may be configured to interact with one or more models 142 and/or 144, which may have been created in accordance with the present disclosure. As discussed, such models may be utilized to effectively analyze such illustrative, non-exclusive criteria as well operability limits, well operability and productivity limits, and/or formation injectivity. In the arrangement of FIG. 12, user tool 262 is based on a common platform to enable analysts to evaluate technical limits at the same time, possibly even simultaneously. An analyst may use one of devices 254, 256, and 258 to operate user tool 262 and to obtain solutions based upon the models. Further, user tool 262 may be configured to provide graphical outputs, or responses, which may permit the analysts to compare outputs from various inputs and/or changes to modeled variables. These graphical outputs may be provided in any suitable form, such as in the form of tables, graphics, and/or charts.

Second device 253 includes a surrogate user tool 268 that is configured to interact with one or more surrogate models 146. Surrogate user tool 268, which may reside in memory within second device 253, may be an application, for example. This application may provide models relating to a subsurface region that includes a well, such as well 103 of FIG. 1. Surrogate user tool 268 may be implemented as a program, routine, software package, or additional computer readable software instructions in an existing program, which may be written in a computer programming language, such as Visual Basic, Fortran, C++, Java and the like. The memory storing surrogate user tool 268 may be of any conventional type of computer readable storage device used for storing applications, which may include hard disk drives, floppy disks, CD-ROMs and other optical media, magnetic tape, flash drives, solid-state devices, and the like.

Associated with surrogate user tool 268, are various engineering models, which may include surrogate models 146. As discussed, surrogate models may be generated from a full-physics model, which may be created from a discretized physics-based model according to the present disclosure. Similar to user tool 262, surrogate models 146 may be accessed by other devices, such as devices 254, 256, and 258, and may be configured to provide responses, which may be outputted, communicated to a user, stored, and/or displayed in accordance with the present disclosure.

In the present disclosure, several of the illustrative, non-exclusive examples of methods have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently. It is within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B", when used in conjunction with open-ended language such as "comprising" can refer, in one embodiment, to A only (optionally including entities, other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B,"

or, equivalently "at least one of A and/or B") can refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" may mean A alone, B alone, C alone, A and B together, A and C together, B and C together, A, B and C together, and optionally any of the above in combination with at least one other entity.

Industrial Applicability

The physics-based models, and the methods of creating and/or utilizing the same, are applicable to the oil and gas industry.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A method for generating a discretized physics-based model of a subsurface region having a shape, the method comprising:
    selecting a pre-solved model related to at least a majority by volume of the subsurface region to be modeled by the discretized physics-based model;
    applying a solution of potential field lines to the pre-solved model to create a mesh the pre-solved model, the mesh including a first set of domain boundaries and the mesh and the pre-solved model forming an intermediate model;
    defining the shape of the subsurface region to be modeled by the discretized physics-based model, the shape including a second set of domain boundaries representing subsurface features not reflected in the intermediate model such that the first set of domain boundaries of the intermediate model is not fully aligned with the shape of the subsurface region represented by the second set of domain boundaries; and
    using a computer processor accessing non-transitory computer processor-readable medium to transform the domain boundaries of the intermediate model to the shape of the subsurface region represented by the second set of domain boundaries of the subsurface region by stretching the mesh of the intermediate model to the shape of the subsurface region defined by the second set of domain boundaries to generate the discretized physics-based model, wherein at least a majority by number of intersections of orthogonal elements within the intermediate model retain orthogonality within 75-105 degrees in the discretized physics-based model.

2. The method of claim 1, wherein the pre-solved model is a pre-solved idealized model.

3. The method of claim 2, wherein the pre-solved model is a pre-solved idealized model selected from the group consisting of pre-solved models for single-phase extraction of a liquid from a subsurface domain, single-phase extraction of a gas from a subsurface domain, radial fluid flow in a subsurface domain, pressure fields within a subsurface domain, stress fields within a subsurface domain, temperature within a subsurface domain, electrostatics within a subsurface domain, and poro-elastics within a subsurface domain.

4. The method of claim 1, wherein the selecting includes selecting a pre-solved model that represents an idealized variant of the physics to be modeled in the subsurface region.

5. The method of claim 1, wherein the pre-solved model is a pre-solved idealized model that does not correspond to the shape of the subsurface region and which was not based upon the subsurface region to be modeled.

6. The method of claim 1, wherein the pre-solved model is selected from the group consisting of a simple source function and region expression, a pre-solved implicit model, and a solution to an explicit analytical function.

7. The method of claim 1, wherein the pre-solved model is a discretized physics-based model of the subsurface region that was created prior to a change in the shape of the subsurface region.

8. The method of claim 1, wherein the pre-solved model includes a solution of potential field lines, and further wherein the applying includes applying the mesh to the solution of potential field lines.

9. The method of claim 1, wherein the selecting includes calculating a solution of potential field lines for the pre-solved model.

10. The method of claim 9, wherein the calculating includes calculating a solution of potential field lines from a plurality of potential field solutions from at least one pre-solved model.

11. The method of claim 9, wherein the calculating includes calculating a solution of potential field lines from a composite of a plurality of potential field solutions from a plurality of pre-solved models.

12. The method of claim 1, wherein the defining the shape of the subsurface region to be modeled includes mathematically defining the boundaries of the subsurface region to be modeled.

13. The method of claim 1, wherein the defining includes defining the shape of the subsurface region utilizing at least one supershape.

14. The method of claim 1, wherein the subsurface region includes at least one subsurface feature having a shape, and further wherein the defining the shape of the subsurface region includes defining the shape of the subsurface feature.

15. The method of claim 14, wherein the at least one subsurface feature includes one or more of a wellbore, a fracture, a perforation, a wormhole, and a fluid-containing reservoir.

16. The method of claim 1, wherein the mesh is an orthogonal mesh, and further wherein the transforming includes preserving at least a substantial portion of the orthogonality of the mesh.

17. The method of claim 1, wherein the transforming includes utilizing at least one of projections, conformal mapping, and level sets techniques.

18. The method of claim 1, wherein the transforming includes utilizing a hyperelastic strain deformation calculation.

19. The method of claim 18, wherein the utilizing a hyperelastic strain definition calculation includes utilizing the pre-solved model as an initial configuration, utilizing the shape of the subsurface region as a final configuration, and assigning a negative Poisson ratio to the pre-solved model.

20. The method of claim 1, wherein the transforming includes using an elastic finite element analysis with a relaxation in the step-size requirement.

21. The method of claim 1, wherein the transforming includes using an elastic finite element analysis with only a predetermined number of iterations.

22. The method of claim 1, wherein the method includes extracting hydrocarbons from the subsurface region based at least in part upon use of the discretized physics-based model.

23. The method of claim 1, wherein the method further includes generating a full-physics model from the discretized physics-based model.

24. The method of claim 23, wherein the method further includes generating at least one surrogate model from the full-physics model.

* * * * *